Aug. 3, 1948.   I. WILLIAMS ET AL   2,446,351
MANUFACTURE OF CARBON BLACK

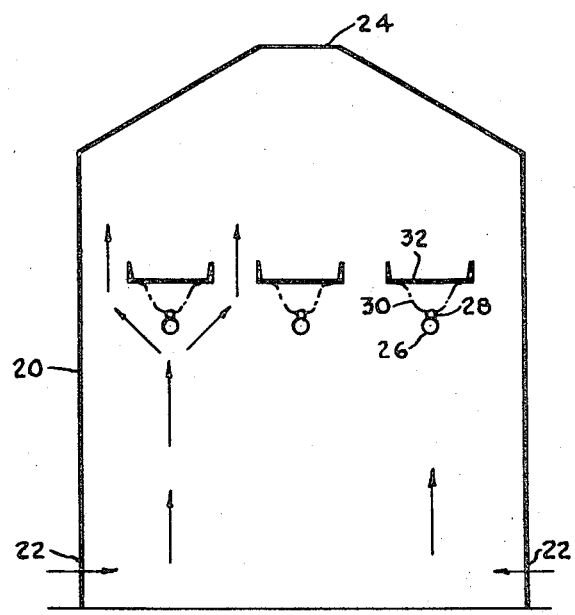
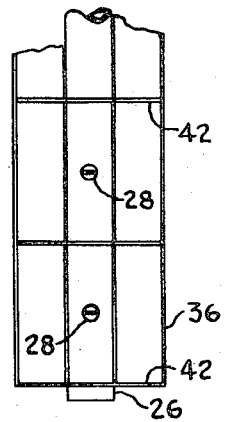
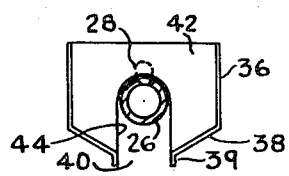
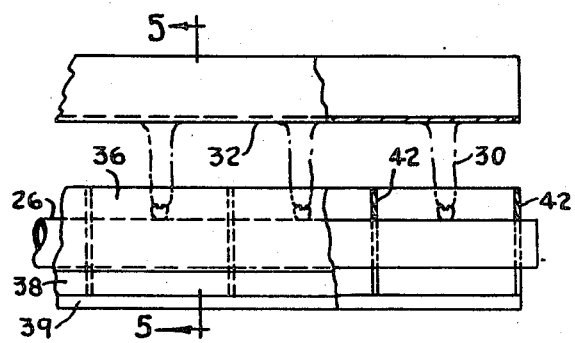
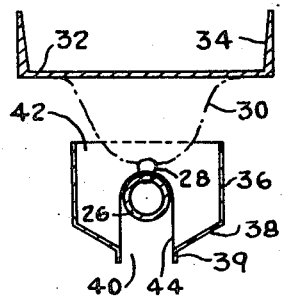

Filed Jan. 11, 1944                                      3 Sheets-Sheet 2

Inventor
IRA WILLIAMS
FRANK W. SELFRIDGE

By  Edwin C. Woodhouse
                    Attorney

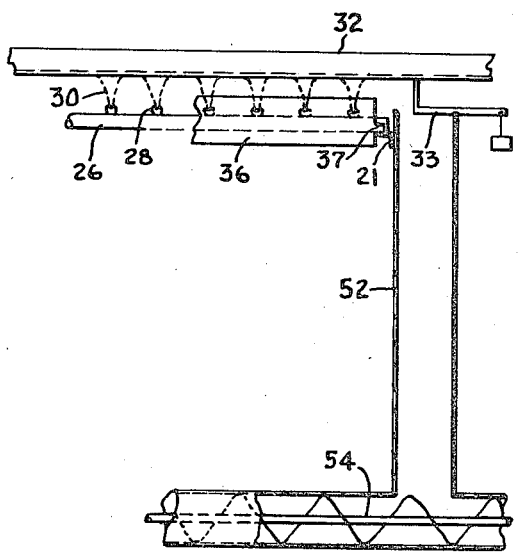
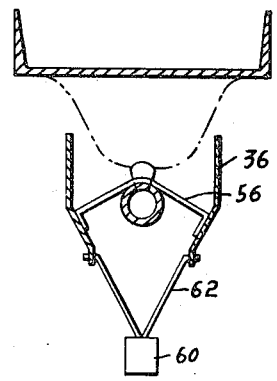
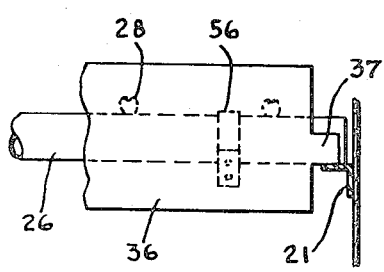
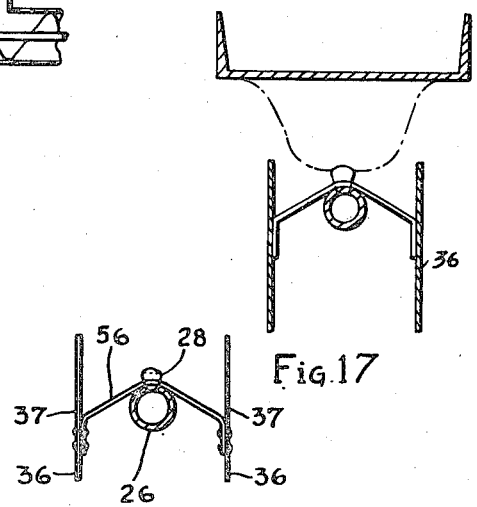
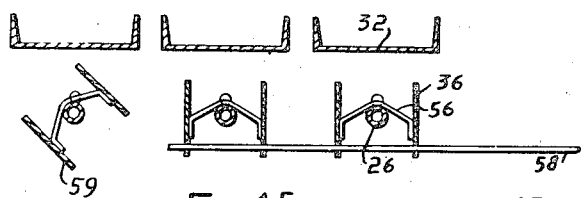

UNITED STATES PATENT OFFICE 2,446,351

MANUFACTURE OF CARBON BLACK

Ira Williams and Frank W. Selfridge, Borger, Tex., assignors to J. M. Huber Corporation, Borger, Tex., a corporation of Delaware Application January 11, 1944, Serial No. 517,772

9 Claims. (Cl. 23—259.6)

This invention relates to the manufacture of carbon black and more particularly to apparatus and to an improved method whereby the yield of carbon black, obtained by the impingement process, may be improved.

The commercial method for the production of carbon black by the impingement process comprises burning natural gas, or other gaseous hydrocarbon fuel, in the presence of oxygen and causing the flame to impinge upon a solid surface such as a channel iron, a plate or a roller. The usual method comprises burning natural gas in flames produced by a multitude of lava tips placed a short distance below the surface of a channel iron from which the carbon is continuously removed. A number of channel irons, with their burner pipes, are placed in parallel and the whole is enclosed within a shed which serves, in a rough manner, to control the amount of air available for combustion and to prevent the wind from interfering with the flames or dispersing the carbon. In spite of the low yield obtained by this method, it continues to be used for the reason that no other method has produced carbon of the same properties and quality.

During the operation of such apparatus, it has been noted that the flames flicker or wobble. It has previously been thought that this is caused by cross-drafts; therefore, it has been proposed to shield the flames from such cross-drafts by closely surrounding the flames with shields which not only protect the flames from cross-drafts, but also usually contact and confine the flames and lead them up to the carbon collecting surfaces. Such shields have not proved to be practical for commercial use, as any improvement in yield obtained thereby was not worth the cost of the shields.

In this type of apparatus, the gas issues from lava tips each having a narrow slot-shaped opening. From 10 to 30 of such lava tips may be held and fed by a single pipe spaced closely beneath each collecting channel. The carbon collects on the channel from which it is removed, but a certain portion falls from the channel so that the burner tips become clogged and fail to function properly. It is essential that the tips be periodically restored to proper working condition by brushing them in such a manner that the bristles of the brush pass through and effectively clean the slots. Since a carbon black producing unit frequently contains hundreds of thousands of such burner tips, the brushing of the tips, when the previously proposed types of shields are employed, requires removal of each shield from each tip and is so time-consuming as to prohibit the use of such shields.

We have found that turbulence of the air in the flame zone is the primary cause of wobbling of the flames. In the usual burner house, the air enters the house near the bottom through narrow slits, forming jets which cause considerable turbulence. The other apparatus in the house, such as the collecting hoppers, braces, burner pipe manifolds, etc., tend to increase such turbulence so that the air, as it rises toward the flame zone, is quite turbulent and has a rolling motion. We have found that we can substantially reduce such turbulence in the air prior to the time the air reaches the flames so that the air, as it reaches the flames, is in the form of a smoothly rising mass of air in substantially streamline flow. Thereby, we are able to effectively overcome the problems previously encountered and to greatly increase the yield of carbon black.

An object of the present invention is to provide an improved method for controlling the combustion of the gaseous fuel in the impingement process of producing carbon black. Another object is to provide a method for improving the yield of carbon black produced by the impingement process without sacrificing any of the desirable properties of the product. A further object is to provide improved apparatus for producing carbon black by the impingement process. A still further object is to provide apparatus for greatly improving the yield of carbon black obtained by the impingement process. Other objects are to advance the art. Still other objects will appear hereinafter.

The above and other objects may be accomplished in accordance with our invention which comprises incompletely burning a gaseous fuel to form a flame which is directed against a solid surface for the deposition of carbon and substantially reducing the turbulence in the air as it approaches the flame and directing substantially all of the air supply for the flame to the flame in a direction substantially parallel to the direction of the flame. This may be accomplished by placing, adjacent to the burner, an air-guiding member or members open at the top and bottom and comprising walls adjacent to, but out of contact with, at least two opposite sides of the flame, said walls extending upwardly from a substantial distance below the base of the flame to the flame and terminating at a point not more than about five-sixths of the height of the flame. By so reducing the turbulence in the air and guiding it to the flame in a direction parallel with the flame, we have been able to materially increase the yield of carbon black obtained by the usual impingement process. Preferably, the air, adjacent to the flame, should have a velocity approaching the velocity of the fuel issuing from the burner. Also, preferably, the air guides are mounted so as to permit them to be tilted, giving ready access to the burner tips for brushing.

Our invention will be more readily understood from the detailed description, hereinafter given, when taken with the accompanying drawings, in which:

Figure 1 is a vertical sectional view, illustrating somewhat diagrammatically the type of apparatus and process ordinarily employed commercially heretofore and to which our invention is to be applied;

Figure 2 is a top plan view of a structure illustrating one embodiment of our invention;

Figure 3 is a side elevation with parts broken away of the structure shown in Figure 2, together with the usual channel iron;

Figure 4 is an end elevation of Figure 2;

Figure 5 is a sectional view taken on the line 5—5 of Figure 3;

Figure 12 represents part of the burner and collecting system of a channel black plant with another modification of the air-guiding members in place, and with parts broken away for clearness of illustration;

Figure 13 is an enlarged detailed view of parts shown in Figure 12 and particularly showing the method of mounting and supporting the air-guiding member;

Figure 14 is an end view of the air-guiding member of Figure 13;

Figure 15 is a sectional view illustrating another modified form of the air-guiding members;

Figure 16 is a sectional view showing still another of the possible forms of the air-guiding members; and Figure 17 is a sectional view showing a further modified form of air-guiding member.

Figure 6:
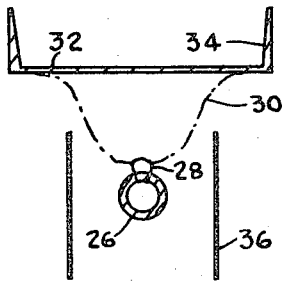
Figure 6 is a sectional view similar to Figure 5, but showing a modified form of the air-guiding members.

Referring first to Figure 1, 20 represents the usual shed having air inlets 22 and air outlet 24. A series of burner pipes 26, carrying a number of burner tips 28, extend the length of the shed. The flames 30 from the burning gaseous fuel impinge upon the channel irons 32 and deposit carbon thereon. Also, enclosed within the shed are braces, burner pipe manifolds, collecting hoppers and other apparatus of the usual type, not shown.

In the usual operations employing such apparatus, the air entering the large space becomes turbulent. The various accessory apparatus in the shed greatly increases the turbulence providing eddy currents and the like. Also, the major flow of air is through the narrow spaces between the channel irons and hence in a direction away from the flames as shown by the arrows in the drawing.

We have found that if air-guiding members are placed adjacent to the burners so as to substantially reduce the turbulence in the air before it reaches the flames and so as to direct the air to the flames in a direction substantially parallel with the flames, we can greatly increase the yield of carbon black. These air-guiding members may be so constructed as to control the amount and velocity of the air to still further increase the yield of carbon. Such control may be obtained by properly proportioning the air inlet at the bottom of the air-guiding members to admit only the amount of air desired and to cause the air to flow at a velocity approaching the velocity of the gaseous fuel. The air-guiding members may be so constructed as to have walls on only two opposing sides of each flame or on three or on all sides of each flame. Each flame may be provided with a separate air-guiding member or a group of flames may be provided with a single air-guiding member. Generally, a burner pipe will be provided with a series of burner tips or openings and an air-guiding member comprising walls extending throughout the length of the burner pipe on each side thereof and parallel with its axis.

The opposing walls of the air-guiding members, opposite the flames, may be spaced apart by varying distances but should be substantially equi-distant from the flames. In general, the walls will be spaced apart by distances varying from about one and one-half times the thickness of the flame to about four times the thickness of the flame opposite the walls. When we speak of the width or thickness of the flame herein or in the claims, we mean the distance through the flame measured at one-half its height and on a horizontal line lying in a plane perpendicular to the opposing walls. Generally, the walls should not be spaced apart substantially further than the width of the channel iron or similar solid surface. Preferably, the walls will be spaced apart by a distance equal to about one and one-half to about three times the flame thickness.

The air-guiding members should be positioned so that the tops of the walls thereof are opposite a point between just below the base of the flame to about five-sixths of the height of the flame. Preferably, the tops of the walls of the air-guiding members should be at a point from about one-quarter the height of the flame and three-quarters of the height of the flame. With the air guides of Figures 2 to 5, we have obtained the best results with the tops of the walls of the air-guiding members positioned at one-half the height of the flames. The vertical position of the tops of the walls, which will give the optimum results, will vary with the overall height of the walls, the spacing of the walls and the distance between adjacent air-guides. The air-guiding members should not be placed so that the flames touch the walls thereof or so that the normal shape of the flames is altered as the yield of carbon black is thereby reduced. Also, if the air-guiding members are placed so low that the walls are completely below the burner pipes, the yield of carbon black is reduced.

The walls of the air-guiding members must extend a substantial distance below the base of the flame, or the tops of the burner tips, so as to substantially reduce the turbulence in the air before it reaches the flames. Preferably, the walls should extend below the tops of the burner tips by a distance equal to at least one-half the distance between the walls. Very satisfactory results are usually obtained by having the walls extend below the tops of the burner tips by a distance equal to from about one-half the distance between the walls to about the distance between the walls. Our air-guides operate on the principles of straightening vanes in air-flow tubes to substantially completely remove the turbulence from the air and give the air a substantially vertical streamline viscous flow as it reaches the flame.

It will generally be desirable to so space the walls of the air-guides that the distance between adjacent walls of different air-guides is such as to substantially reduce the turbulence in the air flowing between different air-guides and cause it to assume a streamline vertical flow. Under these conditions, the turbulence in all of the air adjacent the flame zone is substantially reduced and the walls of the air-guides need not extend above the burner tips. Thus, the most desirable conditions are obtained with all of the air in the flame zone rising at a uniform speed and in a vertical direction. Under such circumstances, the speed of the air in the flame zone can be controlled readily by control of the amount of air admitted to the burner house. Restrictions in the lower openings of the guide walls are then unnecessary to control the speed of the air.

For best results, the air-guiding walls should be thin and the spaces between the walls and between air-guides should be unobstructed so as not to so reduce the area, through which the air flows to the flames, as to cause the air to flow to the flames at a velocity materially greater than that of the gas issuing from the burner tips. Air, reaching the flame at a materially higher velocity than that of the gas, tends to mix with the gas to cause more complete combustion and reduce the yield of carbon. By "thin," we mean having the thickness of sheet metal, which corresponds to from about 0.005 inch to about 0.5 inch. They should be as thin as the material from which they are made will permit, while being of sufficient rigidity to hold their form under the conditions of use. They may be made thicker than 0.5 inch, if desired, but in such case the lower edges, at least, should be tapered to a thin edge so as to produce the desired streamline flow.

The air-guides of our invention, particularly when they do not extend any substantial distance above the burner tips, may be mounted fixedly in their desired position. However, this generally needlessly complicates the necessary brushing of the tips, and, hence, it is usually preferred to mount the air-guides so that they can be tilted through a substantial angle to avoid interference with brushing and cleaning of the burner tips.

A preferred embodiment of our invention is shown in Figures 2 to 5, inclusive. It will be understood that the structure of these figures is illustrative of a plurality of similar structures enclosed in a shed as is usual. The burner pipe 26 carries a series of lava burner tips 28 of the usual construction. The burner pipe may conveniently be one inch in diameter. The gaseous fuel enters the burner pipe 26 and issues from lava tips 28 and is there burned forming flames 30, which impinge upon the channel 32 and deposit carbon thereon. The burner tips can conveniently be arranged at distances of from about 1½ to 3½ inches below the surface of the channel iron. The air-guiding members 36 have upwardly extending walls about 2⅜ inches in height with the top portions terminating about 2 inches below the channel iron. The lower portions 38 of the air-guiding members are bent inward to reduce the opening width between the lower portions of the air-guiding members to about 1⅞ inches to somewhat restrict the flow of air through the opening 40 formed by the downwardly extending walls 38. The channel iron 32, as disclosed, is about 8 inches in width and has vertical walls 34 about 2½ inches high. Each lava tip, as shown, is provided with a slot extending across the pipe whereby the flame has a greater width across the pipe than along the axis of the pipe. Partitions 42 are placed between the walls of the air-guiding member, the burner tips, and at the ends. These partitions are joined to the walls of the air-guiding member by rivets, welding or in any other suitable manner. They rest upon the burner pipe and support the entire air-guiding member thereon so that it may be tilted about the pipe to permit brushing of the tips. They form additional walls enclosing each flame on all sides giving maximum efficiency. The partitions 42 may be omitted from between the burner tips without greatly decreasing the yield of carbon produced.

In Figure 6, the air-guiding members merely comprise two vertical walls which may be supported in the desired relationship to the burner pipe in any suitable manner, not shown. In this structure, the walls 36 are 4½ inches in height, spaced 4½ inches apart and their tops are positioned 1¾ inches below the channel iron 32. The burner pipe 26 is a 1 inch pipe and the burner tips are positioned 2¾ inches below the channel iron. The walls extend 3½ inches below the tops of the burner tips.

Figure 7:
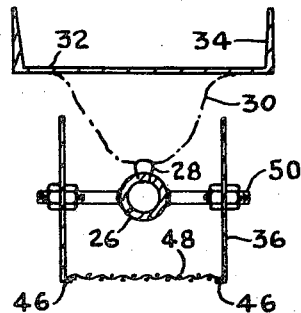
Figure 7 is a sectional view similar to Figure 5, but showing still another modification of the air-guiding members.

In the modification shown in Figure 7, the air-guiding member comprises two vertical walls 36, 5 inches in height and spaced 5 inches apart. The tops of the walls are positioned 1¼ inches below the channel iron. The bottom edges of the vertical walls have inturned edges 46, ½ inch in width for supporting a 16 mesh wire screen 48, the 1 inch burner pipe 26 is positioned so that the burner tips are 2¾ inches from the channel iron. The air-guiding member 36 is supported in position by bolts 50 welded to the sides of the burner pipe. The wire screen provides restricted openings for the air controlling the amount and the velocity of the air flow and also aids in directing the flow of air in a direction parallel to the flame. The screen may vary between 100 mesh and 5 mesh where the diameter of the wire is about one-half the width of the openings in the screen.

It will be understood that the dimensions given in the descriptions of Figures 2 to 7, inclusive, are given for illustrative purposes only and are not intended to be limiting.

Figure 8:
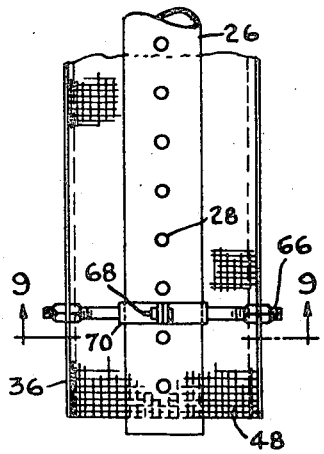
Figures 8 and 9 are a top view and a sectional view, respectively, showing a different structure of burner with an air-guiding member similar to that of Figure 7.
Figure 9:
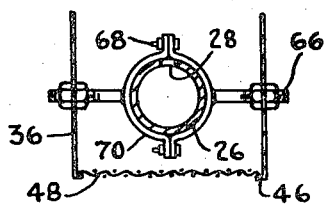

In the modification shown in Figures 8 and 9, the burner tips were replaced by Number 26 wire gauge holes spaced on ¼ inch centers. The air-guiding member is similar to that of Figure 7 except that the vertical walls were spaced 6 inches apart and the bolts 66, carrying the walls 36, were mounted on a split bearing 70 with the halves thereof fastened together by nuts and bolts 68. Otherwise, the structure and arrangement of parts in this modification is the same as that in Figure 7.

Figure 10:
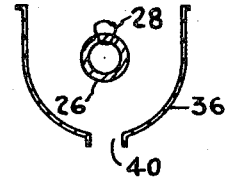
Figure 10 is a sectional view illustrating another modification of the air-guiding members.

Figure 10 shows a modified form of air-guiding member which is a trough, circular in cross-section, having the bottom opening 40 in the form of a slot.

Figure 11:
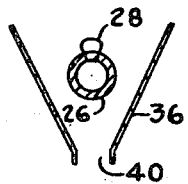
Figure 11 is a sectional view showing still another modification of the air-guiding members.

In the modification of Figure 11, the walls of the air-guiding member 36 diverge upwardly forming a V-shaped trough having a slot in the base thereof to provide the opening 40.

In the modification shown in Figures 12 to 14, inclusive, the collecting channel 32 is supported by members, not shown, in such a way that it can reciprocate slowly lengthwise above the flames 30. The flames 30, issuing from the burner tips 28 in the burner pipe 26, play on the channel and deposit carbon thereon. As the channel moves longitudinally, the scraper 33 scrapes the carbon from the channel and causes it to fall into the hopper 52 from which it is collected by a screw conveyor 54. The walls 36 of the air-guiding member are provided with lugs 37 which rest on the brace 21 mounted on the wall of the hopper 52. The walls of the air-guiding member consist of thin sheets of incombustible material, such as sheet iron, connected together by a strap 56 bent upwardly in the center to form a bearing for supporting the air guide on the burner pipe while permitting the air guide to be tilted about the burner pipe. During operation, the air guide will be supported in its vertical position by the lugs 37 resting on the brace 21. When it is desired to clean the burner tips, the air guide may be shifted longitudinally to disengage the lugs 37 from the brace 21 so that the air guide may be tilted. In order to more readily permit the longitudinal movement of the air guide, it will preferably be made in two sections, each section forming an air guide for one-half of the burner pipe between hoppers.

Figure 15 is representative of a different method which may be employed for maintaining the guides in a vertical position. According to this structure, a rod 58 extends through holes 59 in the sides of the air guides for two or more burner pipes. The holes 59 are sufficiently loose so that the rod 58 may be readily inserted for maintaining the guides in vertical position and readily withdrawn to permit the air guides to be tilted or removed. Also, in this structure, the distances between the walls of individual air guides are equal to the distances between the adjacent walls of different air guides so that the turbulence in all of the air rising to the burner zone is uniformly controlled.

In the modification of Figure 16, the lower portion of the air-guiding walls is bent inwardly so as to restrict the opening in the bottom to control the speed of the air passing between the walls. While the inwardly bent portion serves to somewhat regulate the amount and velocity of the air, the principal object is to more fully eliminate any turbulence remaining in the air in a plane parallel to the walls of the air-guiding member. This air guide is normally maintained in a vertical position by means of a weight 60 supported from the lower edges of the sides of the air guide by supporting wires 62. This air guide can be rotated about the burner pipe to permit brushing of the tips without removing the weight 60.

Figure 17 represents an air guide similar to that of Figure 6 and supported on the burner pipe in the same manner as the air guides of Figures 12 to 16, inclusive. In this figure, the walls 36 are extended further below the burner tips. This structure more completely reduces the turbulence in the air. Also, the center of gravity of the air guide is well below its point of support on the burner pipe so that it is very effectively maintained in its vertical position by its own weight. It can, however, be readily tilted to permit brushing of the burner tips.

It will be apparent that the air-guiding members of our invention affect not only the air which rises to the immediate vicinity of the flames, but have a similar effect on all of the air rising to the level of the flames. It is apparent that the distances between the different air-guiding members can very well be equal to, or less than, the distance between the sides of a single air guide to effectively control the turbulence in the air throughout the entire flame zone. This control of the turbulence between the different air-guiding members effectively eliminates the necessity for shields extending about the upper portions of the flames.

In each of the figures, the air-guiding members 36 have been disclosed as being made of sheet iron. It will be understood that they may be made of any suitable material which has sufficient mechanical strength and will withstand the high temperatures of approximately 1100° F. They may be made of iron, iron alloys, such as chromium alloys, steel, aluminum, porcelain and other suitable materials. The channel irons or other carbon collecting surfaces may be made of the same or similar materials. Ordinarily, the channels are made of structural steel.

In order to more fully illustrate our invention, the preferred modes of carrying the same into effect and the advantageous results to be obtained thereby, the following examples are given:

*Example 1*

An apparatus, for producing carbon black by burning natural gas against an 8 inch channel with a 1 inch burner pipe carrying 14 tips spaced 4½ inches apart and positioned 2¾ inches below the channel, gave a yield of 1.93 pounds of carbon black per 1,000 cubic feet of gas when the gas was burned at the rate of 2.7 cubic feet per tip per hour.

The burners were then provided with #18 gauge sheet iron air-guides as shown in Figures 2 to 5, inclusive. The vertical walls of the air-guides were 2⅜ inches in height, the bottom portions were turned inward to make an angle of 110° and were 1¾ inches deep. The distance between the vertical sides of each air-guide was 4½ inches and the bottom opening was 1⅛ inches. The top edge of each air-guide was 2 inches below the channel surface. The two halves of the air-guide were held together at the ends and supported on the pipe by means of end partitions 42 made of sheet iron, but the intermediate partitions were omitted. A yield of 2.45 pounds of carbon black per thousand cubic feet of gas was obtained when natural gas was burned at the rate of 2.7 cubic feet per tip per hour.

When this was repeated with the intermediate partitions in place, the yield was further increased slightly.

*Example 2*

An experiment was conducted in which the air-guide consisted of two vertical pieces of #18 gauge sheet iron 4½ inches high, placed 4½ inches apart with the top 1¾ inches below the channel, as shown in Figure 6.

The burners and channels were the same as in Example 1. When natural gas was burned, with the burner thus shielded, at the rate of 2.7 cubic feet per tip per hour, a yield of 2.35 pounds of carbon per 1,000 cubic feet of gas was obtained. The carbon black, which was obtained, was compared with carbon, produced by an unshielded burner, and found to impart substantially the same physical properties to rubber. The color, when rubbed out in mineral oil, was also substantially identical.

Example 3

An air-guide was constructed as shown in Figure 7 and was essentially a trough having vertical sides 5 inches high of 18 gauge sheet iron and a bottom 4 inches wide of 16 mesh screen woven from 22 gauge iron wire. This screen retarded the rapid upward motion of the air. The top edge of the air-guide was 1¼ inches below the bottom of the channel. The burners and channels were the same as in Example 1. When gas was burned at the same rate as in Examples 1 and 2, a yield of 2.45 pounds of carbon black per 1,000 cubic feet of gas was obtained.

Example 4

A burner was constructed as follows: A two inch pipe was drilled along a straight line extending the length of the pipe with #26 wire gauge holes space on ¼ inch centers, the distance between holes being 0.103 inch. This construction is shown in Figures 8 and 9. Gas was supplied to the pipe at a pressure of about 0.03 inch of water. This burner was located 2 inches below the surface of the collecting channel. This burner produced a thin ribbon of flame extending the entire length of the burner and, when unshielded, produced a yield of 0.8 pound of carbon black per 1,000 cubic feet of natural gas. When combined with an air-guide, such as that described in Example 3 but about one inch wider, a yield of 1.8 pounds was obtained.

The size and setting of the air-guides can be varied considerably and still produce favorable results as shown by the following examples.

Example 5

The burner of Example 1 was fitted with various air-guides of the type used in Example 1 and shown in Figures 2 to 5, but of varying top widths. In all cases, the vertical positions of the air guides of Figures 2 to 5 were not changed in dimensions but were separated by different distances. The lengths of the lower inturned portion were adjusted in each case to maintain a bottom opening of 1$\frac{7}{16}$ inches. The following results were obtained when gas was burned at the rate shown in Example 1:

| Distances Between Vertical Portions of Air-guides | Yield of Black Lbs./1000 ft.³ of Gas |
| --- | --- |
| 3 inches | 2.38 |
| 4½ inches | 2.45 |
| 6 inches | 2.35 |
| 8 inches | 2.30 |

Example 6

An experiment was conducted in which the air-guides, described in Example 2, were separated by different distances with the following results:

| Distance Between Walls of Air-guides | Lbs. Yield of Black |
| --- | --- |
| 3 inches | 2.28 |
| 4½ inches | 2.35 |
| 7 inches | 2.20 |
| 9½ inches | 2.15 |

Example 7

A carbon black unit, consisting of an 8 inch collecting channel with slotted tips placed 4½ inches apart along the burner pipe and spaced 2¾ inches below the channel, when burning gas at the rate of 2.7 cubic feet per hour per tip, gave a yield of 1.93 pounds of carbon per 1000 cubic feet of gas burned. The burners were then equipped with air-guiding members constructed as shown in Figures 12 to 14. The sides of the air-guide were spaced equal distances from each side of the burner tips and were separated by 4½ inches. They extended one inch above the burner tips and 3½ inches below them. When gas was burned at the previous rate, the yield of carbon was increased to 2.35 pounds per 1000 feet of gas burned.

It will be understood that the above examples are given for illustrative purposes only. Air-guiding members of the forms shown in Figures 10, 11, 15, 16 and 17 have also been employed with satisfactory results. Also, the positions of the air-guiding members, relative to the flame and the channel, may be varied without departing from our invention. For example, the air-guiding members of Example 1 and Figures 2 to 5, inclusive, were raised until the tops of the walls were within ¾ inch of the channel. The yield of carbon was still increased over that obtained in the absence of air-guiding members, but the flame touched the walls of the air-guiding member and the greatest possible yield was not obtained. Also, when the air-guiding member was lowered so that the tops of the walls were 4 inches below the channel, the effectiveness of the air-guiding member was reduced and the maximum yield of carbon was not obtained.

It will be apparent that the shapes of the air-guiding members may be widely varied. However, in the preferred construction, the major portion of the side walls are vertical and the admission of air from the bottom is restricted either by bending the lower portions of the air-guiding members inwardly or by covering the bottom openings with a wire screen or by a combination of these two methods. However, the position, form and structure of the air-guiding members can be widely varied to meet any special conditions as can be readily determined by one skilled in the art from the directions herein given without departing from the spirit of our invention. It is only necessary that the air-guiding members have two opposing walls adjacent the flame extending a substantial distance below the base of the flame so as to substantially reduce the turbulence in the air before it reaches the flame and directing or guiding the air to the flame in a direction substantially parallel with the direction of the flame.

This application is, in part, a continuation of our earlier application Serial No. 368,047, filed November 30, 1940, for "Manufacture of carbon black," now abandoned.

We claim:

1. Apparatus for producing carbon black by the impingement process which comprises a plurality of parallel elongated channel members, a burner pipe spaced below each channel member and extending parallel to the channel member, a series of longitudinally spaced slotted burner tips in the upper surface of each burner pipe so located as to emit a series of longitudinally spaced flat streams of burning gaseous fuel impinging upon the lower surface of the channel member and depositing carbon on such lower surface, air-guiding members open at the top and bottom and having only walls extending substantially vertically and comprising two substantially vertical walls adjacent to, but out of contact with, opposite sides of each burner pipe extending parallel to the axis of the burner pipe for substantially the length of the channel member, said walls extending upwardly from below the burner pipe and terminating at a point between the top of the burner pipe and five-sixths of the distance from the burner pipe to the channel member and being spaced apart by a distance greater than the width of the burner pipe but less than the width of the channel member, the walls being spaced substantially equal distances from the sides of the burner pipe, partitions intermediate each two spaced burner tips and at each end of each pair of spaced walls, each partition lying in a plane at right angles to the axis of the burner pipe and extending from one vertical spaced wall to the other, the walls and partitions being out of contact with the streams of burning fuel with no portion of said walls or partitions converging toward the streams of burning fuel, and a common enclosure for said channel members, burner pipes and air-guiding members.

2. Apparatus for producing carbon black by the impingement process which comprises a plurality of parallel elongated solid heat resisting members each having a flat lower surface, a gas supply line, a row of burner tips below each solid member connected to the gas supply line and so located as to produce flat streams of burning gaseous fuel impinging upon the lower surface of the solid member along its length and depositing carbon on said surface, air-guiding members open at the top and bottom and having only walls extending substantially vertically and comprising two thin substantially vertical walls adjacent to, but out of contact with, opposite sides of each row of burner tips and extending parallel to the row of burner tips, said walls extending upwardly from below the burner tips and terminating at a point substantially between the burner tips and five-sixths of the distance from the burner tips to the lower surface of the solid member and being spaced apart by a distance equal to from about one-half the width of the solid member to about the width of the solid member and being spaced substantially equal distances from the burner tips, said walls extending downwardly below the tops of the burner tips by a distance equal to at least one-half the distance between the walls, no portion of said walls converging toward the streams of burning fuel, and a common enclosure for said solid members, burner tips and air-guiding members.

3. Apparatus for producing carbon black by the impingement process which comprises a plurality of parallel elongated solid heat resisting members each having a flat lower surface, a gas supply line, a row of burner tips below each solid member connected to the gas supply line and so located as to produce flat streams of burning gaseous fuel impinging upon the lower surface of the solid member along its length and depositing carbon on said surface, air-guiding members open at the top and bottom and having only walls extending substantially vertically and comprising two thin substantially vertical walls adjacent to, but out of contact with, opposite sides of each row of burner tips and extending parallel to the row of burner tips, said walls extending upwardly from below the burner tips and terminating at a point substantially between the burner tips and five-sixths of the distance from the burner tips to the lower surface of the solid member and being spaced apart by a distance equal to from about one-half the width of the solid member to about the width of the solid member and being spaced substantially equal distances from the burner tips, said walls extending downwardly below the tops of the burner tips by a distance equal to from about one-half the distance between the walls to about the distance between the walls, no portion of said walls converging toward the streams of burning fuel, and a common enclosure for said solid members, burner tips and air-guiding members.

4. Apparatus for producing carbon black by the impingement process which comprises a plurality of parallel elongated channel members, a burner pipe spaced below each channel member and extending parallel to the channel member, a plurality of slotted burner tips in the upper surface of each burner pipe so located as to produce flat streams of burning gaseous fuel impinging upon the lower surface of the channel member along substantially its full length and depositing carbon on said surface, air-guiding members open at the top and bottom and having only walls extending substantially vertically and comprising two thin substantially vertical walls adjacent to, but out of contact with, opposite sides of each burner pipe and extending parallel to the axis of the burner pipe, said walls extending upwardly from below the burner pipe and terminating at a point between the top of the burner pipe and five-sixths of the distance from the burner pipe to the lower surface of the channel member and being spaced apart by a distance equal to from about one-half the width of the channel member to about equal the width of the channel member and being spaced substantially equal distances from the sides of the burner pipe, no portion of said walls converging toward the streams of burning fuel, said walls extending downwardly below the tops of the burner tips by a distance equal to at least one-half the distance between the walls, and a common enclosure for said solid members, burner pipes and air-guiding members.

5. Apparatus for producing carbon black by the impingement process which comprises a plurality of parallel elongated solid heat resisting members each having a flat lower surface, a gas supply line, a row of burner tips below each solid member connected to the gas supply line and so located as to produce flat streams of burning gaseous fuel impinging upon the lower surface of the solid member along its length and depositing carbon on said surface, air-guiding members open at the top and bottom and having only walls extending substantially vertically and comprising two substantially vertical walls adjacent to, but out of contact with, opposite sides of each row of burner tips and extending parallel to the row of burner tips, said walls extending upwardly from below the burner tips and terminating at a point substantially between the burner tips and five-sixths of the distance from the burner tips to the lower surface of the solid member and being spaced apart by a distance equal to from about one-half the width of the solid member to about the width of the solid member and being spaced substantially equal distances from the burner tips, said walls extending downwardly below the tops of the burner tips by a distance equal to at least one-half the distance between the walls, no portion of said walls converging toward the streams of burning fuel, means rotatably supporting each air-guiding member on an axis parallel with the row of burner tips so that the air-guiding member can be rotated through a substantial angle about such axis but normally maintaining the air-guiding member in a position wherein the walls extend vertically, and a common enclosure for said solid members, burner tips and air-guiding members.

6. Apparatus for producing carbon black by the impingement process which comprises a plurality of parallel elongated solid heat resisting members each having a flat lower surface, a burner pipe spaced below each solid member and extending parallel to the solid member, a plurality of burner tips in the upper surface of each burner pipe so located as to produce flat streams of burning gaseous fuel impinging upon the lower surface of the solid member along its length and depositing carbon on said surface, air-guiding members open at the top and bottom and having only walls extending substantially vertically and comprising two substantially vertical walls adjacent to, but out of contact with, opposite sides of each burner pipe and extending parallel to the axis of the burner pipe, said walls extending upwardly from below the burner pipe and terminating at a point between the top of the burner pipe and five-sixths of the distance from the burner pipe to the lower surface of the solid member and being spaced apart by a distance greater than the width of the burner pipe but not substantially greater than the width of the solid member and being spaced substantially equal distances from the sides of the burner pipe, no portion of said walls converging toward the streams of burning fuel, means rotatably supporting each air-guiding member on the burner pipe so that the air-guiding member can be rotated through a substantial angle about the burner pipe but normally maintaining the air-guiding member in a position wherein the walls extend vertically, and a common enclosure for said solid member, burner pipe and air-guiding members.

7. Apparatus for producing carbon black by the impingement process which comprises a plurality of parallel elongated channel members each having a flat lower surface, a burner pipe spaced below each solid member and extending parallel to the channel member, a plurality of slotted burner tips in the upper surface of each burner pipe so located as to produce flat streams of burning gaseous fuel impinging upon the lower surface of the solid member along substantially its full length and depositing carbon on said surface, air-guiding members open at the top and bottom and having only walls extending substantially vertically and comprising two thin substantially vertical walls adjacent to, but out of contact with, opposite sides of each burner pipe and extending parallel to the axis of the burner pipe, said walls extending upwardly from below the burner pipe and terminating at a point between the top of the burner pipe and five-sixths of the distance from the burner pipe to the lower surface of the channel member and being spaced apart by a distance equal to from about one-half the width of the channel member to about equal the width of the channel member and being spaced substantially equal distances from the sides of the burner pipe, said walls extending downwardly below the tops of the burner tips by a distance equal to at least one-half the distance between the walls, no portion of said walls converging toward the streams of burning fuel, means connecting the two walls of each air-guiding member, said means resting on and being supported by the burner pipe without being fastened to the burner pipe so that the air-guiding member can be rotated about the burner pipe through a substantial angle, the center of gravity of the air-guiding member being below the axis of the burner pipe, and a common enclosure for said solid member, burner pipe and air-guiding members.

8. Apparatus for the production of carbon black which comprises a gas supply line, a plurality of burner tips connected to said supply line, a substantially rectangular imperforate shield extending around and substantially above and below each burner tip, said shield being so constructed as to prevent air being laterally directed into the flame and as to cause laminar flow in the flame zone, and between the flame and the walls of the shield, and having a permanently bright inner reflecting surface, and a member arranged at such height above the tips as to present a cooling surface against which the flame may impinge.

9. Apparatus for the production of carbon black which comprises a gas supply line, a plurality of burner tips connected to said supply line a substantially imperforate aluminum shield having straight substantially vertical side walls, extending around and substantially above and below each burner tip, said shield being so constructed as to prevent air being laterally directed into the flame and to cause laminar flow in the flame zone and between the flame and walls of the shield, and a member arranged at such height above the tips as to present a cooling surface against which the flame may impinge.

IRA WILLIAMS.
FRANK W. SELFRIDGE.

REFERENCES CITED

The following references are of record in the file of this patent:

UNITED STATES PATENTS

| Number | Name | Date |
| --- | --- | --- |
| 1,891,202 | Lewis | Dec. 13, 1932 |
| 2,399,591 | Amon | Apr. 30, 1946 |